US011155311B2

(12) United States Patent
Regan

(10) Patent No.: US 11,155,311 B2
(45) Date of Patent: *Oct. 26, 2021

(54) VEHICLE AERODYNAMIC IMPROVEMENT APPARATUS AND SYSTEM

(71) Applicant: Strehl, LLC, Phoenix, AZ (US)

(72) Inventor: Jesse Regan, San Diego, CA (US)

(73) Assignee: Strehl, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,507

(22) Filed: Sep. 19, 2019

(65) Prior Publication Data

US 2020/0010127 A1 Jan. 9, 2020

Related U.S. Application Data

(63) Continuation of application No. 15/647,035, filed on Jul. 11, 2017, now Pat. No. 10,442,478, which is a continuation-in-part of application No. 15/093,733, filed on Apr. 7, 2016, now Pat. No. 9,708,017.

(51) Int. Cl.
*B62D 35/00* (2006.01)
*B62D 37/00* (2006.01)
*B62D 37/02* (2006.01)

(52) U.S. Cl.
CPC ......... *B62D 35/002* (2013.01); *B62D 35/001* (2013.01); *B62D 37/02* (2013.01)

(58) Field of Classification Search
CPC ..... B62D 35/002; B62D 35/001; B62D 37/02
USPC ..................................................... 296/180.4
See application file for complete search history.

(56) References Cited

U.S. PATENT DOCUMENTS

| | | | |
|---|---|---|---|
| 3,960,402 A | 6/1976 | Keck | |
| 4,320,920 A | 3/1982 | Goudey | |
| 6,257,654 B1 | 7/2001 | Boivin et al. | |
| 6,485,087 B1 | 11/2002 | Roberge et al. | |
| 6,959,958 B2 | 11/2005 | Basford | |
| 7,641,262 B2 | 1/2010 | Nusbaum | |
| 7,950,720 B2 * | 5/2011 | Skopic | B62D 35/001 296/180.1 |
| 7,976,096 B2 * | 7/2011 | Holubar | B62D 35/001 296/180.1 |
| 8,196,995 B2 | 6/2012 | Chen | |
| 8,382,194 B2 | 2/2013 | Wood | |
| 8,672,391 B1 | 3/2014 | Cobb | |
| 9,199,673 B2 | 12/2015 | Baker | |
| 10,442,478 B2 * | 10/2019 | Regan | B62D 35/002 |

(Continued)

OTHER PUBLICATIONS

Davis et al., 2014 Vehicle Technologies Market Report, Report, 2014, 6th edition, Oak Ridge National Laboratory.

*Primary Examiner* — Joseph D. Pape
*Assistant Examiner* — Dana D Ivey
(74) *Attorney, Agent, or Firm* — Noblitt & Newson, PLLC

(57) ABSTRACT

System and apparatus for improving aerodynamics of a vehicle including: a plurality of stiffeners offset from each other; a first airfoil configured as a thin-form sheet; a second airfoil coupled to the first airfoil using the plurality of stiffeners, wherein a trailing edge of the first airfoil overlaps a leading edge of the second airfoil; an airflow inlet defined by a leading edge of the first airfoil and a pair of stiffeners of the plurality of stiffeners; and an airflow outlet defined by the trailing edge of the first airfoil, the leading edge of the second airfoil, and the pair of stiffeners.

9 Claims, 15 Drawing Sheets

(56) References Cited

U.S. PATENT DOCUMENTS

2014/0319872 A1 10/2014 Kunkel
2015/0097393 A1 4/2015 Dieckmann et al.

* cited by examiner

VEHICLE AERODYNAMIC IMPROVEMENT APPARATUS AND SYSTEM

CROSS-REFERENCE TO RELATED APPLICATIONS

This application is a continuation application of co-pending U.S. patent application Ser. No. 15/647,035, filed Jul. 11, 2017, and entitled "Vehicle Aerodynamic Improvement Apparatus and System," which is a continuation-in-part application of U.S. patent application Ser. No. 15/093,733, filed Apr. 7, 2016, and entitled "Vehicle Aerodynamic Improvement Apparatus and System" (now U.S. Pat. No. 9,708,017 issued on Jul. 18, 2017). The disclosure of the above-referenced application is incorporated herein by reference.

BACKGROUND

Technological Field

The present disclosure relates to improving aerodynamics of a primary vehicle or a secondary vehicle towed by a primary vehicle.

Background

Despite advances in technology providing more fuel-efficient power generation for vehicles, efforts continue to strive for a more efficient vehicle overall. A large factor in vehicle efficiency lies in the aerodynamics of the vehicle. While the design of smaller road-going passenger vehicles adapts through continuous design revisions between model years, the road-going truck market, particularly the long-haul or Class 8 segment of the market has not been able to adapt as quickly. Also referred to as a "semi-truck" or "semi," long-haul trucks transport mass quantities of goods through the use of trailers sometimes in excess of 50 feet in length and 60,000 pounds of payload capacity. The modern semi-truck trailer has undergone little design improvement for aerodynamic efficiency over several decades. Furthermore, the average fuel economy of a road-going semi-truck towing a loaded trailer is only 7.2 miles per gallon (Davis, Stacy C. 2014 *Vehicle Technologies Report*. Oakridge, Tenn.: U.S. Dept. of Energy, 2014. ORNL/TM-2015/85). There are currently over 5.6 million semi-trailers registered for use in the United States alone. The lifespan of an average semi-trailer typically spans 12-15 years, as such the immediate redesign of the standard semi-trailer will do little to improve overall efficiency in the near-term. As a result, there is a need for a near-term solution that improves aerodynamic efficiency of semi-trailers in a cost-efficient manner.

Aerodynamic drag is a primary contributing factor to fuel consumption when operating a road-going truck and trailer at highway speeds. Friction drag and pressure drag are two variables surrounding aerodynamic drag. Friction drag surrounds the interaction of the ambient air and the surface of the trailer as it moves through it. However, the effects of friction drag are limited in comparative nature to pressure drag when considering a semi-trailer. Pressure drag is a dominant acting variable in the aerodynamic consideration of a semi-trailer. Pressure drag is caused by large pressure differentials in the wake of a trailer due to rapid flow separation creating turbulent flow characteristics. Turbulent flow characteristics can create such phenomena as a Kaman vortex street, which is a repeating pattern of swirling vortices caused by the unsteady separation of flow of a fluid around blunt bodies. Such turbulent characteristics cause inefficient aerodynamic flow, due to increased pressure drag, and may even create unsafe oscillation of the trailer. In extreme cases this can result in destabilization and tip-over of the trailer and the primary vehicle.

SUMMARY

Efforts to improve aerodynamics of a vehicle such as a semi-trailer by addressing the aft end of the vehicle typically surrounds the improvement of flow separation to provide a more laminar and consistent flow further aft of the vehicle so as to prevent large pressure differentials which may cause eddy formation, vortices or other inefficient flow dynamics. In the improvement of the aerodynamics of a vehicle, it will be appreciated that the convergence of flow, post separation, is desired to converge quickly and with decreased turbulent flow characteristics.

In one embodiment, an apparatus for improving aerodynamics of a vehicle is disclosed. The apparatus includes: a plurality of stiffeners offset from each other; a first airfoil configured as a thin-form sheet; a second airfoil coupled to the first airfoil using the plurality of stiffeners, wherein a trailing edge of the first airfoil overlaps a leading edge of the second airfoil; an airflow inlet defined by a leading edge of the first airfoil and a pair of stiffeners of the plurality of stiffeners; and an airflow outlet defined by by the trailing edge of the first airfoil, the leading edge of the second airfoil, and the pair of stiffeners.

In another embodiment, a system for improving aerodynamics of a vehicle is disclosed. The system includes: first and second aerodynamic units, each aerodynamic unit including a first airfoil configured as a thin-form sheet and a second airfoil interconnected to the first airfoil using a plurality of stiffeners, wherein a trailing edge of the first airfoil overlaps a leading edge of the second airfoil, wherein the first and second aerodynamic units are configured to mount to side surfaces of the vehicle; and a third aerodynamic unit shaped in a convex form and configured to mount to a top surface of the vehicle.

In yet another embodiment, an apparatus for improving aerodynamics of a vehicle is disclosed. The apparatus includes: multiple means for stiffening and supporting, each means offset from the other means of the multiple means; means for creating an aerodynamic force; means for stabilizing the aerodynamic force created by the means for creating, the means for stabilizing coupled to the means for creating using the multiple means for stiffening and supporting, wherein a trailing edge of the means for creating partially overlaps a leading edge of the means for stabilizing; means for enabling air to flow in defined by a leading edge of the means for creating and the multiple means for stiffening; and means for enabling the air to flow out defined by the trailing edge of the means for creating, the leading edge of the means for stabilizing, and the multiple means for stiffening.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

The present disclosure surrounds an apparatus and system for the aerodynamic improvement of a vehicle, typically surrounding airflow near a rear-ward portion of the vehicle. Embodiments of the present disclosure describe an apparatus and a system typically mounted to a rear-ward portion of a semi-trailer for aerodynamic improvement. The aerodynamic improvements as applied mitigate inefficient aerodynamic phenomena. Such aerodynamic phenomena may include but is not limited to: Kaman vortex street, rapid flow separation and turbulent flow characteristics.

Figure 1:
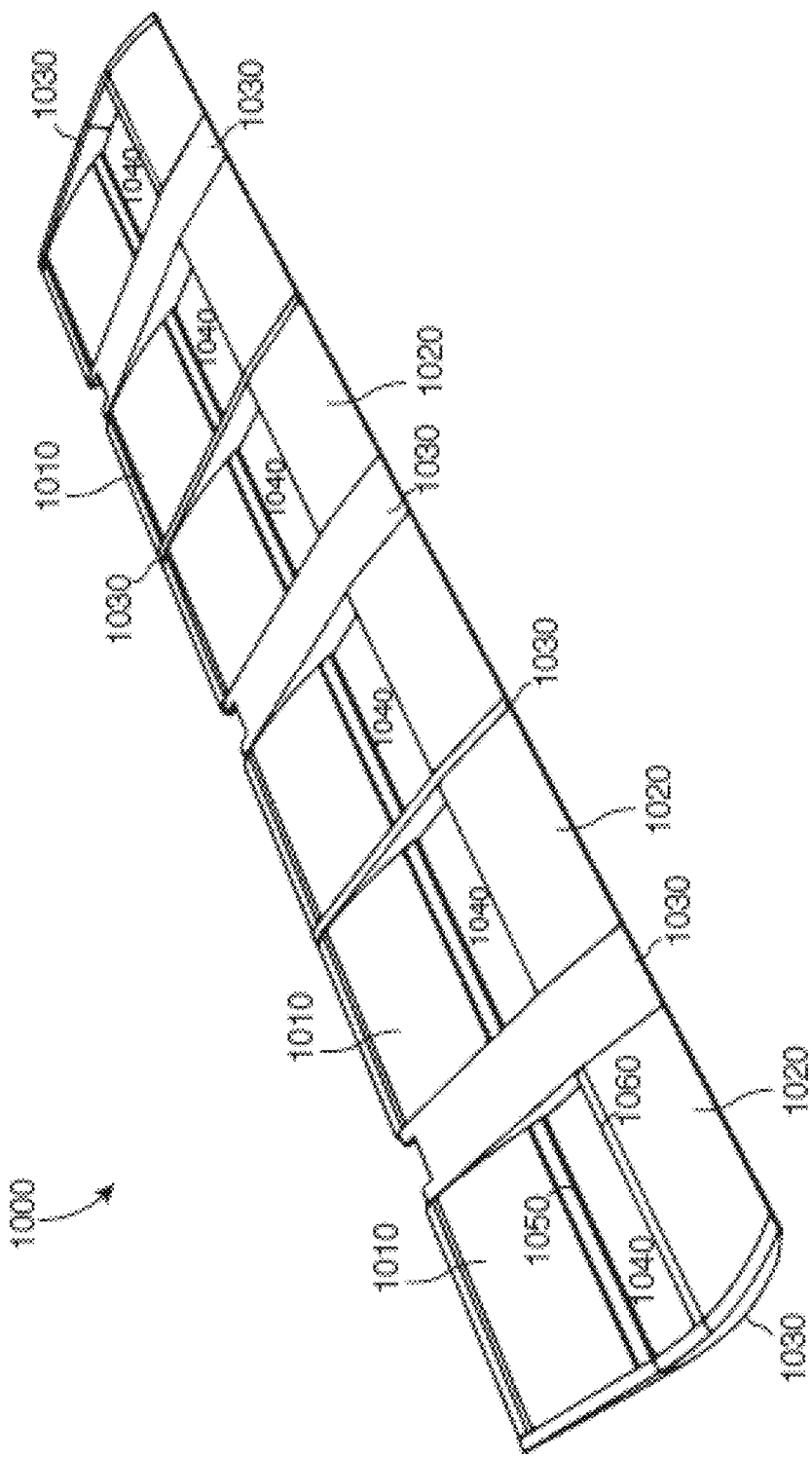
FIG. 1 is a perspective view of an outward face of a planar form in certain embodiments.

An apparatus, as shown in FIG. 1 comprises an aerodynamic device 1000 further comprising an airfoil 1010 and a stabilizer 1020 interconnected by a series of stiffeners 1030 spanning between them. The apparatus further comprises a plurality of apertures 1040 defined by a trailing edge 1050 of the airfoil 1010, a leading edge 1060 of a stabilizer 1020, and two stiffeners 1030. In one embodiment, an airfoil is defined as a body which creates an aerodynamic force when moved through a fluid such as air.

Figure 2:
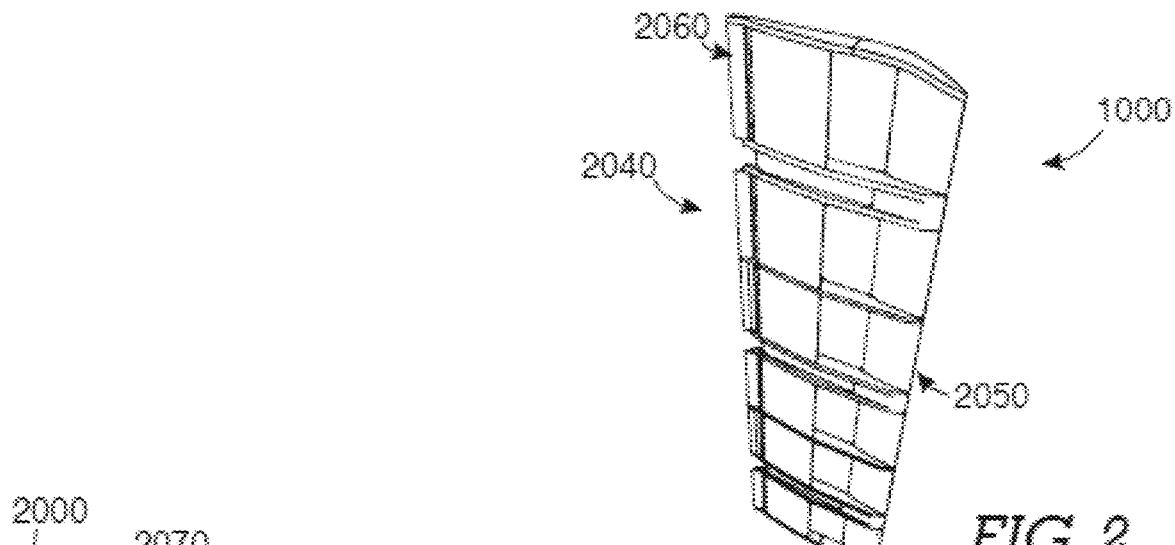
FIG. 2 is a perspective view of an inward face of a planar form in certain embodiments.
Figure 3:
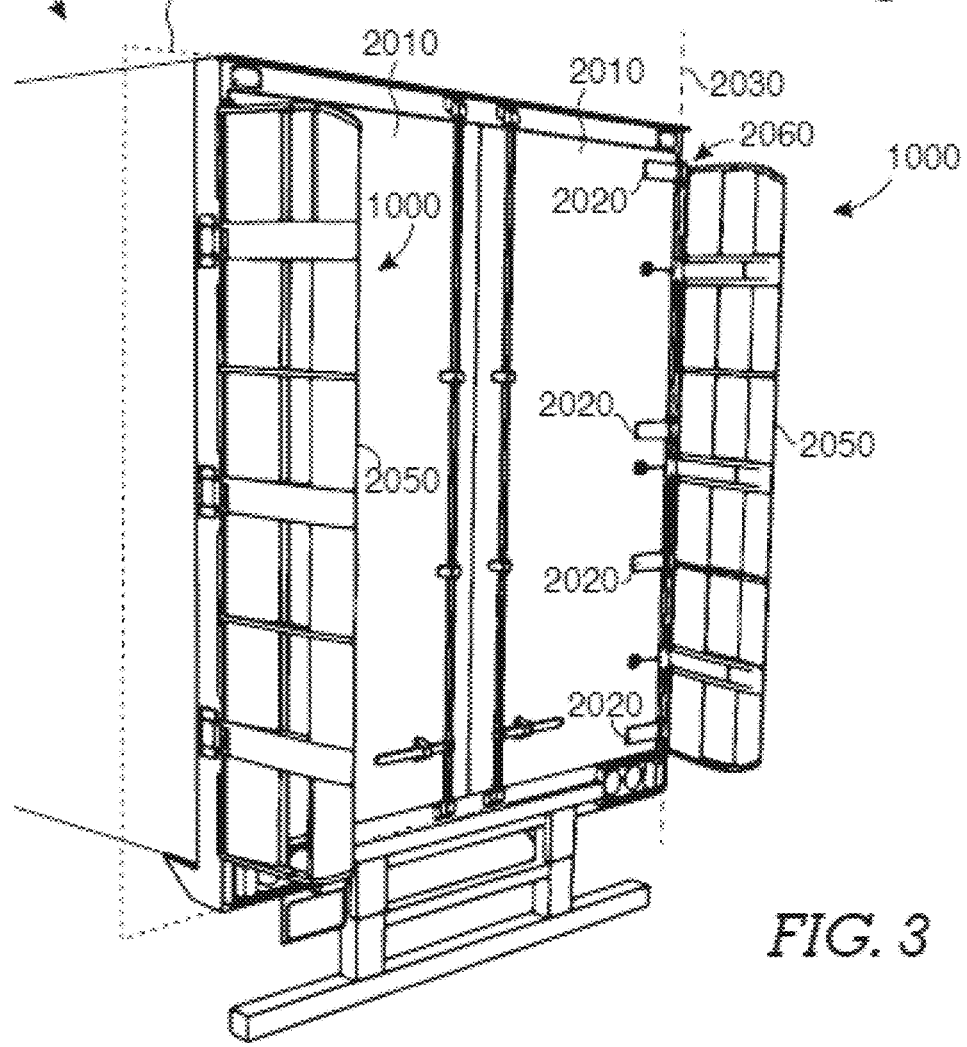
FIG. 3 is a perspective view of a planar forms attached to a vehicle in certain embodiments.
Figure 4:
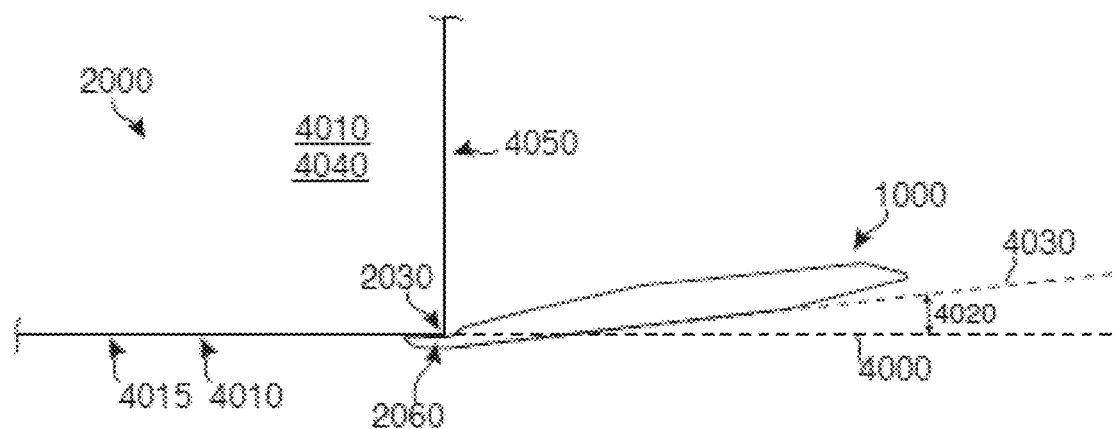
FIG. 4 is a top view of a planar form attached to a trailing edge of a vehicle in certain embodiments.

Certain embodiments of an apparatus, as shown in FIG. 2 and FIG. 3 comprise an aerodynamic device 1000 having a leading edge 2040 and a trailing edge 2050. The aerodynamic device 1000, referring to FIG. 2, further comprises an edge-recess 2060 near the aerodynamic device leading edge 2040. Referring to FIG. 4, the edge-recess 2060 of certain embodiments is configured to mate with a vertical trailing edge 2030 of a vehicle 2000. Referring to FIG. 3, it will be appreciated that certain vehicles 2000 have door hinges 2020 associated with doors 2010 coincident with an aft-plane 2070. Referring again to FIG. 3, an edge-recess 2060 of an aerodynamic device 1000 is configured to provide clearance between the aerodynamic device 1000 and a door hinge 2020 proximate to the trailing edge 2030 of a vehicle 2000.

In certain embodiments as shown in FIG. 4, an apparatus for the aerodynamic improvement of a vehicle comprising an aerodynamic device 1000 is mated to a vertical trailing edge 2030 of a vehicle 2000 disposed at a device offset angle 4020 from a reference plane 4000.

In certain embodiments, a reference plane 4000 is coincident with an external planar surface 4010 of a vehicle 2000. The reference plane 4000 in the context of a semi-trailer is coincident with an external planar surface 4010 of the semi-trailer, such as a side-surface 4015 or top surface 4040. It may be desired to attach the aerodynamic device 1000 to the vertical trailing edge 2030 of the vehicle 2000 with the aerodynamic device 1000 directed inward toward the vehicle. It may be further desired to direct the aerodynamic device 1000 inward toward the vehicle at a device offset angle 4020 of 7-degrees inward from a reference plane 4000.

Figure 5A:
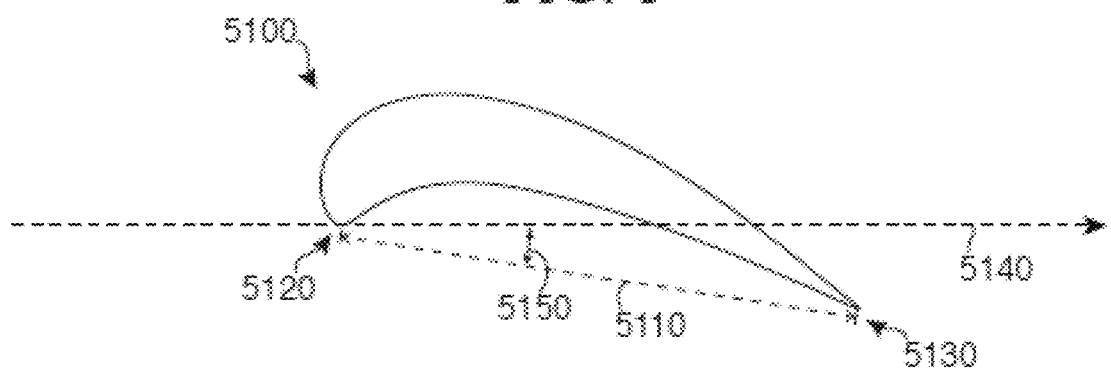
FIG. 5A shows a typical air-foil.

As shown in FIG. 5A, it will be appreciated by those skilled in the art that a chord 5110, as used in reference to an aerodynamic form 5100, refers to a measurement aligned with the flow profile of the aerodynamic form 5100. The chord 5110 spans from a leading edge 5120 to a trailing edge 5130 of the aerodynamic form 5100. The angle of attack 5150 will be appreciated by those skilled in the art as indicating an angle between the general airflow 5140, also referred to as relative wind, and the chord 5010. In certain embodiments discussed herein, the airflow 5140 is parallel to a reference plane of a vehicle.

Figure 5B:
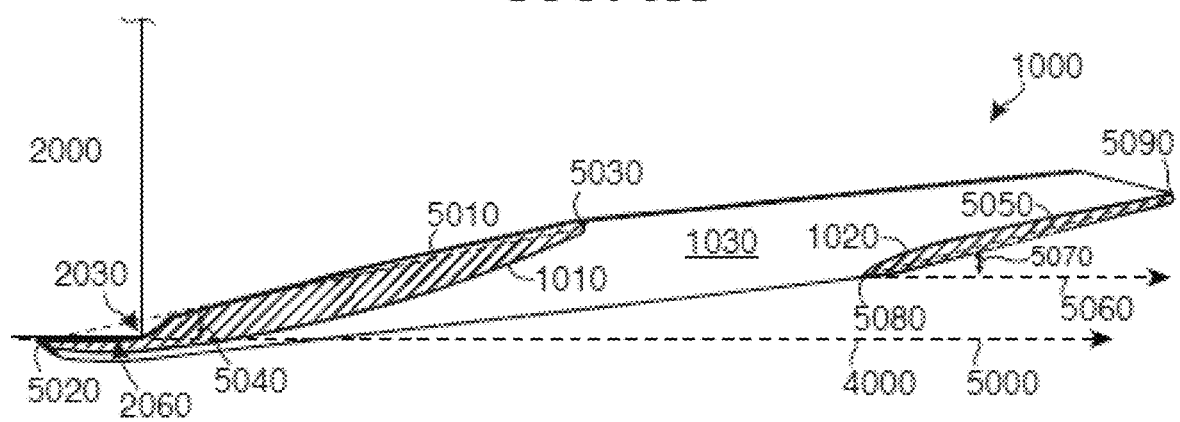
FIG. 5B is a cross-sectional view of an air foil form and a stabilizer component of a planar form in certain embodiments.

Certain embodiments, referring to FIG. 5B, comprises an aerodynamic device 1000 further comprising an airfoil 1010, a stabilizer 1020, a stiffener 1030 and an edge-recess 2060. The airfoil 1010 has an airfoil chord 5010 spanning from an airfoil leading edge 5020 to an airfoil trailing edge 5030. The stabilizer 1020 has a stabilizer chord 5050 spanning from a stabilizer leading edge 5080 to a stabilizer trailing edge 5090. In such embodiments the edge-recess 2060 is configured to interface with a trailing vertical edge 2030 of a vehicle 2000. With the edge-recess 2060 remaining parallel to a reference plane 4000 of the vehicle 2000, the airfoil angle of attack 5040 and stabilizer angle of attack

5070 may be disposed at an angle greater than zero. It may also be desired for the airfoil angle of attack 5040 and stabilizer angle of attack 5070 to be set at different values. It may be further desired to have the stabilizer leading edge 5080 offset laterally inward from the reference plane 4000.

Figure 6:
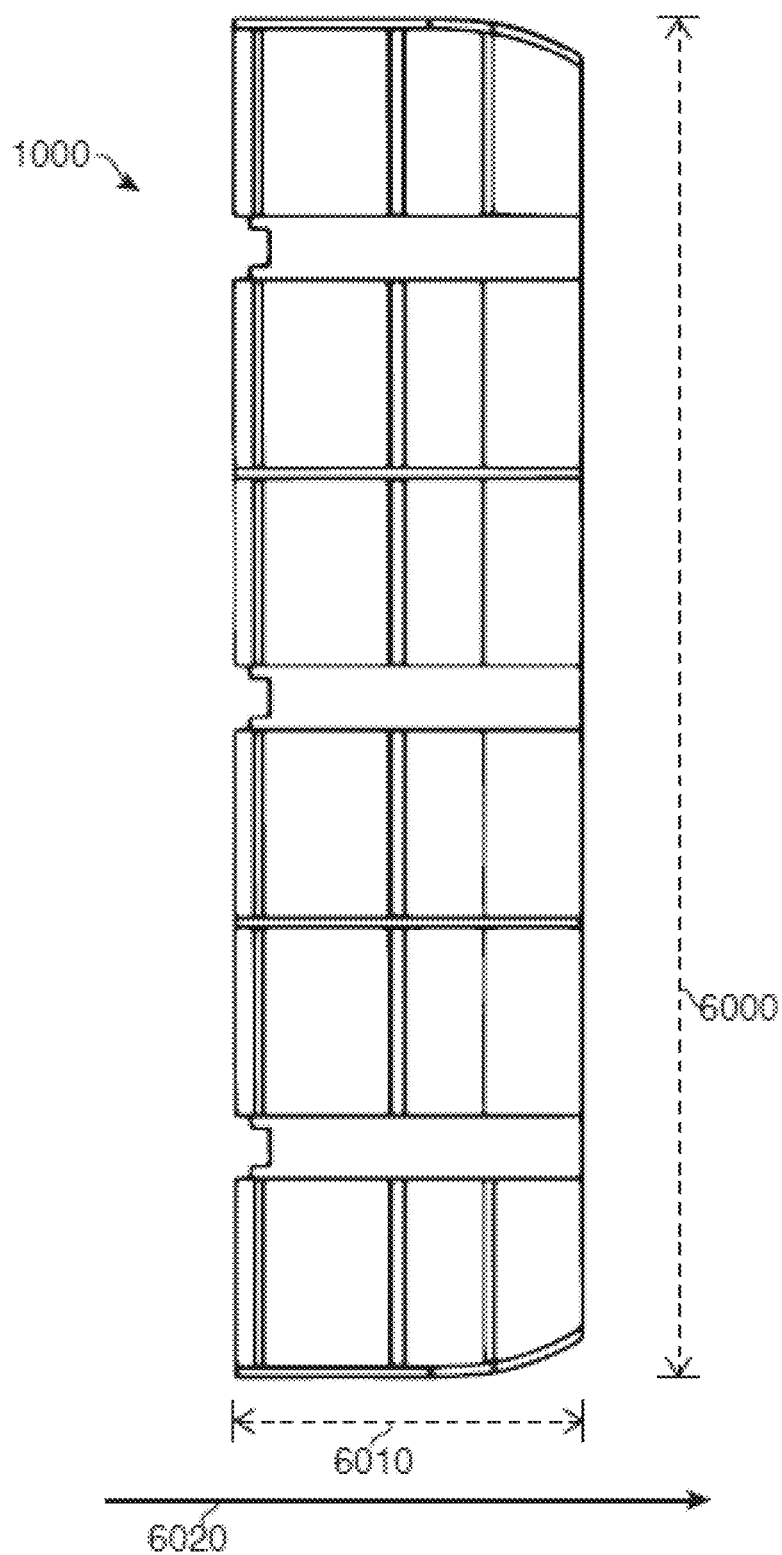
FIG. 6 is a plan view of a planar form in certain embodiments.

In certain embodiments, as shown in FIG. 6, for the aerodynamic improvement of a vehicle further comprising an aerodynamic device 1000 is configured for fixation proximal to a trailing vertical edge of a semi-trailer. In a variation of such embodiments, the length 6000 of the aerodynamic device, spans 271.7 cm (107 inches) and the width 6010 spans 68.6 cm (27 inches). In such embodiments, the width of the aerodynamic device or portion thereof extends rearward, in the direction of general airflow 6020 and away from the semi-trailer.

Figure 7A:
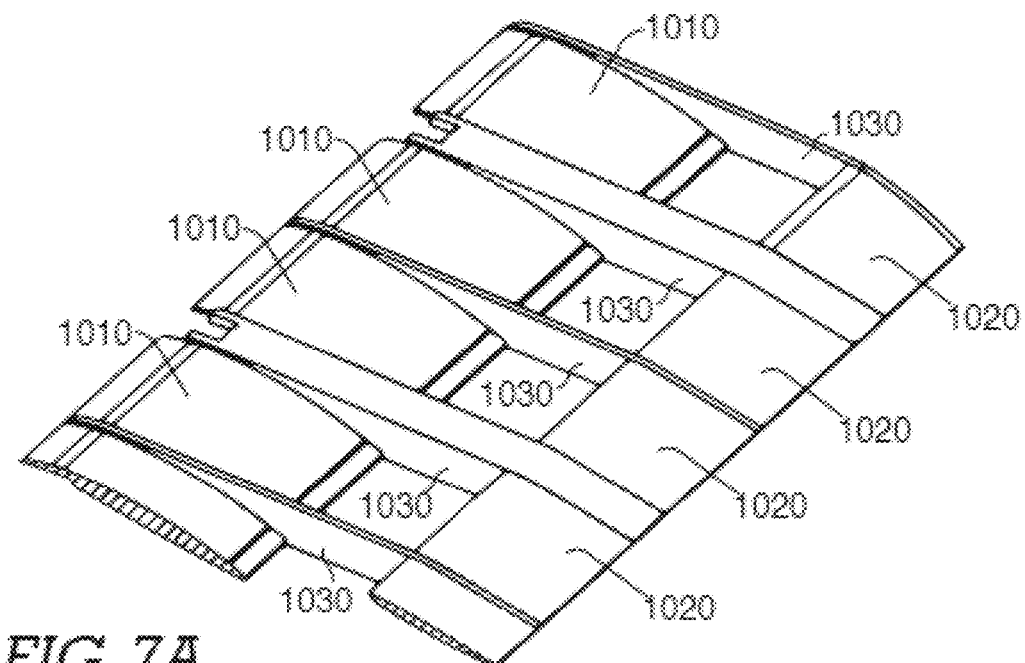
FIG. 7A is a perspective cross-sectional view of a planar form in certain embodiments.
Figure 7B:
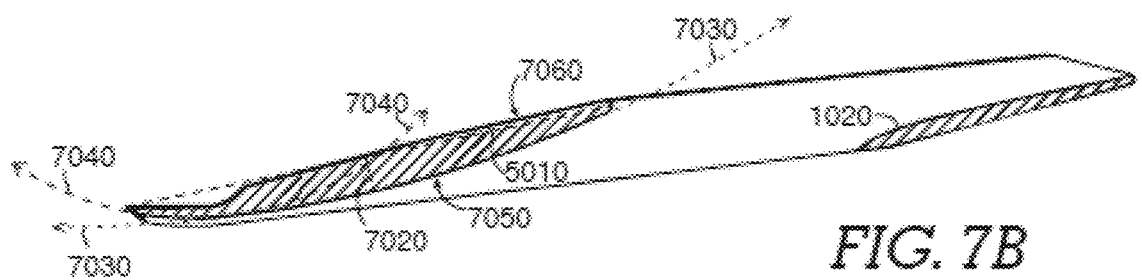
FIG. 7B is a cross-sectional view of a planar form in certain embodiments.

Certain embodiments of an apparatus comprising an aerodynamic device 1000, as shown in FIG. 7A, further comprises an airfoil 1010 in coordination with a stabilizer 1020 interconnected by a plurality of stiffeners 1030. Referring to FIG. 7B, an airfoil 1010 has a chord length 5010 of 33.8 cm (13.3 inches) and a maximum thickness 7020 of approximately 2.5 cm (1 inch). The airfoil 1010 has an airfoil primary surface 7050 as defined by an airfoil leading arc 7040 of radius of 61 cm (24 inches) coincident with the airfoil leading edge 2040. The airfoil primary surface is further defined by an airfoil trailing arc 7030 of radius of 121.9 cm (48 inches), such that the airfoil trailing arc 7030 is coincident with the airfoil trailing edge 5030 and tangential to the airfoil leading arc 7040. In certain embodiments, an airfoil 1010 has a substantially planar secondary airfoil surface 7060. In such embodiments, the airfoil angle of attack 5040 is 11.5-degrees from a reference line defined by the edge recess 2060 configured to interface with a reference plane 4000 of a vehicle 2000 as shown in FIG. 5B. In such embodiments, referring to FIG. 7C, the airfoil 1010 leading edge 2040 is coincident with the aerodynamic device leading edge 2040.

Figure 7C:
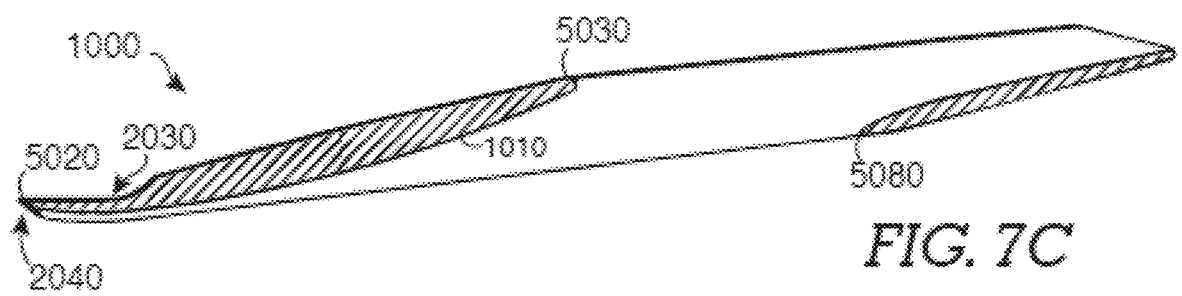
FIG. 7C is a cross-sectional view of a planar form in certain embodiments.
Figure 7D:
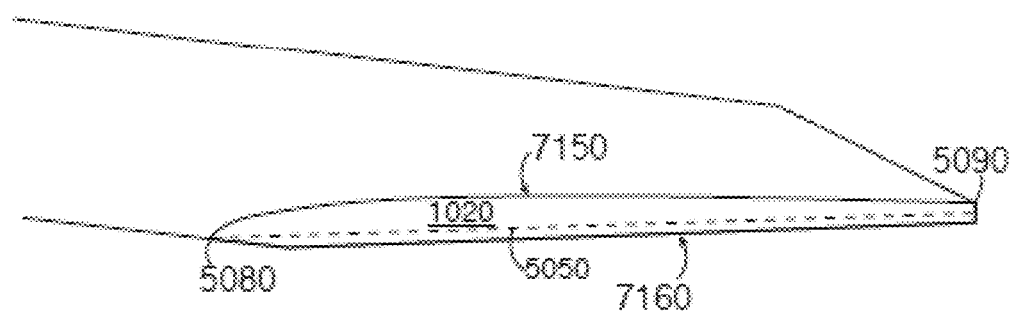
FIG. 7D is a cross-sectional magnified view of a stabilizer component of a planar form in certain embodiments.
Figure 7E:
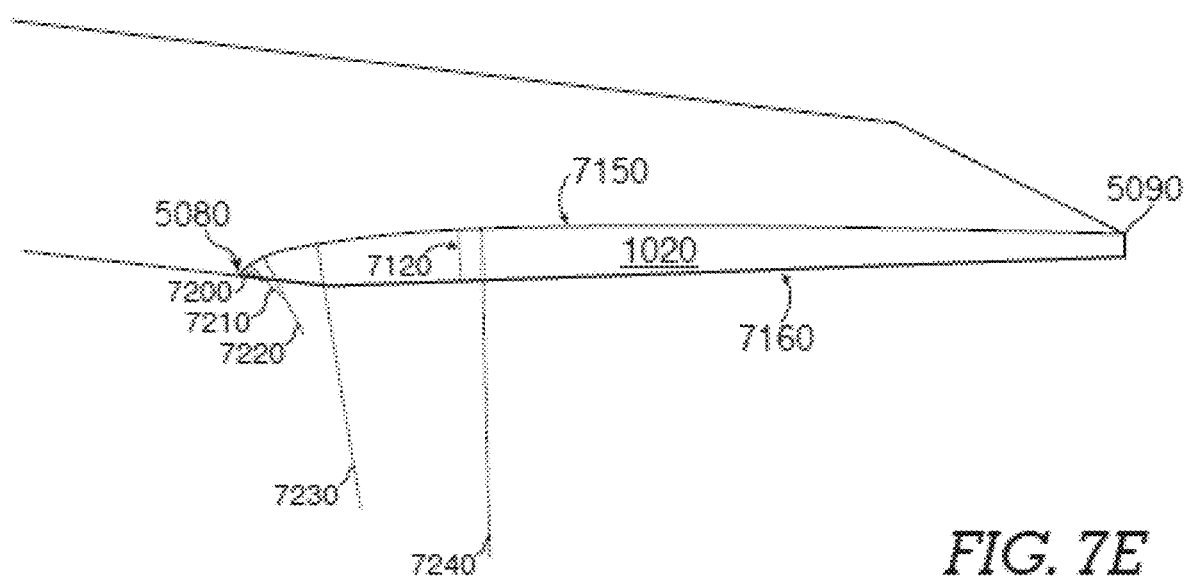
FIG. 7E is a cross-sectional magnified view of a stabilizer component of a planar form in certain embodiments.

Referring to FIG. 7D and FIG. 7E, certain embodiments of a stabilizer 1020 has a primary stabilizer surface 7150 and a substantially planar secondary stabilizer surface 7160. In such embodiments, a stabilizer 1020 has stabilizer chord 5050 of length 19.4 cm (7.62 inches) and a stabilizer maximum thickness 7120 of 1.27 cm (0.5 inch). A primary stabilizer airflow surface 7150 is defined by a stabilizer leading edge 5080 with a 0.51 cm (0.2 inch) leading edge arc 7200 connected to a series of tangentially interconnected arcs spanning from the stabilizer leading edge 5080 to the stabilizer trailing edge 5090. Following the leading edge arc 7200 is a first stabilizer arc 7210 of 1.0 cm (0.4 inch), then a second stabilizer arc 7220 of 1.9 cm (0.75 inch), a third stabilizer arc 7230 of 7.62 cm (3 inches), and a fourth stabilizer arc 7240 of 88.9 cm (35 inches) extending to a stabilizer trailing edge 5090. The stabilizer trailing edge 5090 of such embodiments has a thickness 1.0 cm (0.4 inch).

Figure 7F:
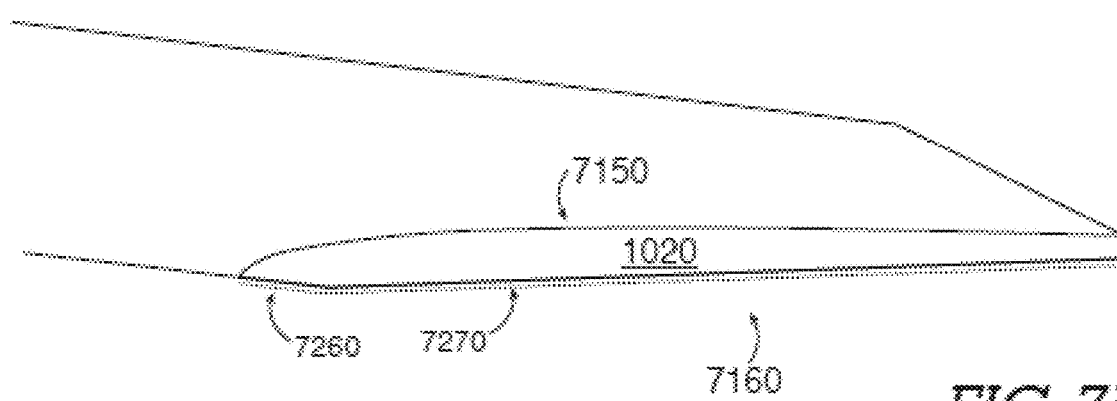
FIG. 7F is a cross-sectional magnified view of a stabilizer component of a planar form in certain embodiments.

Referring to FIG. 7F, in certain embodiments, the secondary stabilizer surface 7160 comprises two planar segments having a first planar segment 7260 of 1.9 cm (0.75 inch) and a second planar segment 7270 of 17.2 cm (6.8 inches). In certain embodiments, as shown in FIG. 7c, the stabilizer is disposed such that the stabilizer leading edge 5080 is 49.5 cm (19.5 inches) laterally from the airfoil leading edge 2040 and offset 3.6 cm (1.4 inches) from the edge recess 2030. In such embodiments, the angle of attack of the stabilizer is disposed at an angle of 14-degrees from the reference line.

It will be appreciated to those skilled in the art that the form, angle of attack, size and location of an airfoil and a stabilizer may vary between vehicle applications, intended speed of vehicle and general environment in which the vehicle operates in based on aerodynamic optimization practices.

Figure 8:
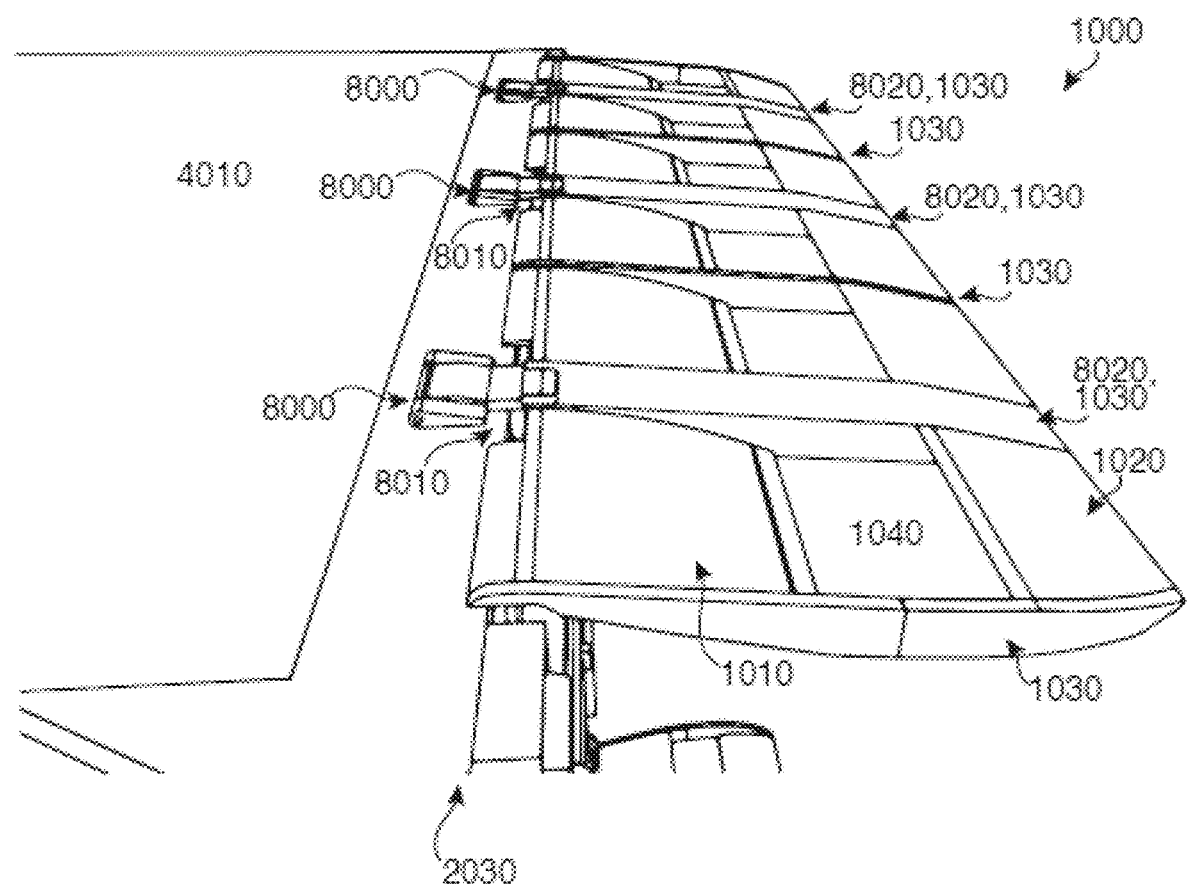
FIG. 8 is a bottom perspective view of a planar form attached to a vehicle in certain embodiments.

An apparatus, as shown in FIG. 8, comprising an aerodynamic device 1000 with stiffeners 1030, an airfoil 1010 and stabilizer 1020. In such an embodiment, a stiffener 1030 further comprises a mounting stiffener 8020. Mounting stiffeners 8020 are configured to affix to the vertical trailing edge 2030 of a vehicle using a hinged mount 8000 affixed to a vertical trailing edge 2030 of a vehicle 2000.

Figure 9A:
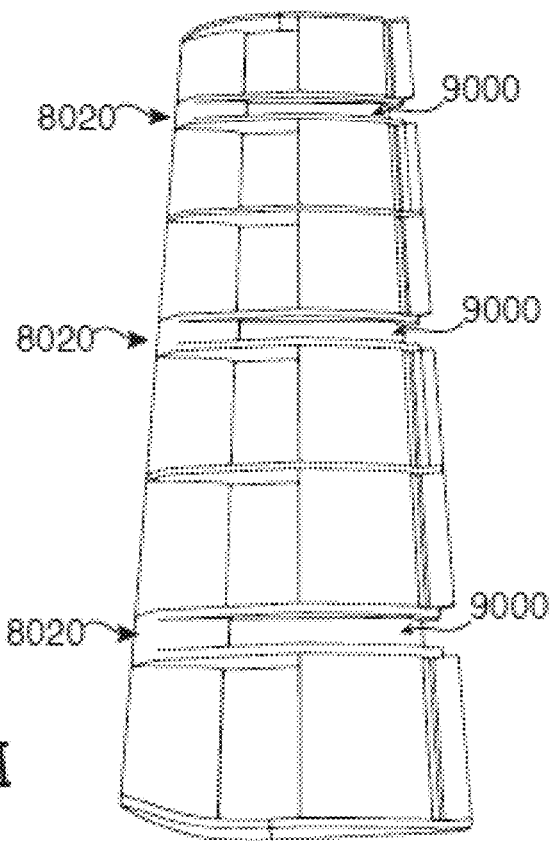
FIG. 9A is a perspective view of an inward face of a planar form in certain embodiments.
Figure 9B:
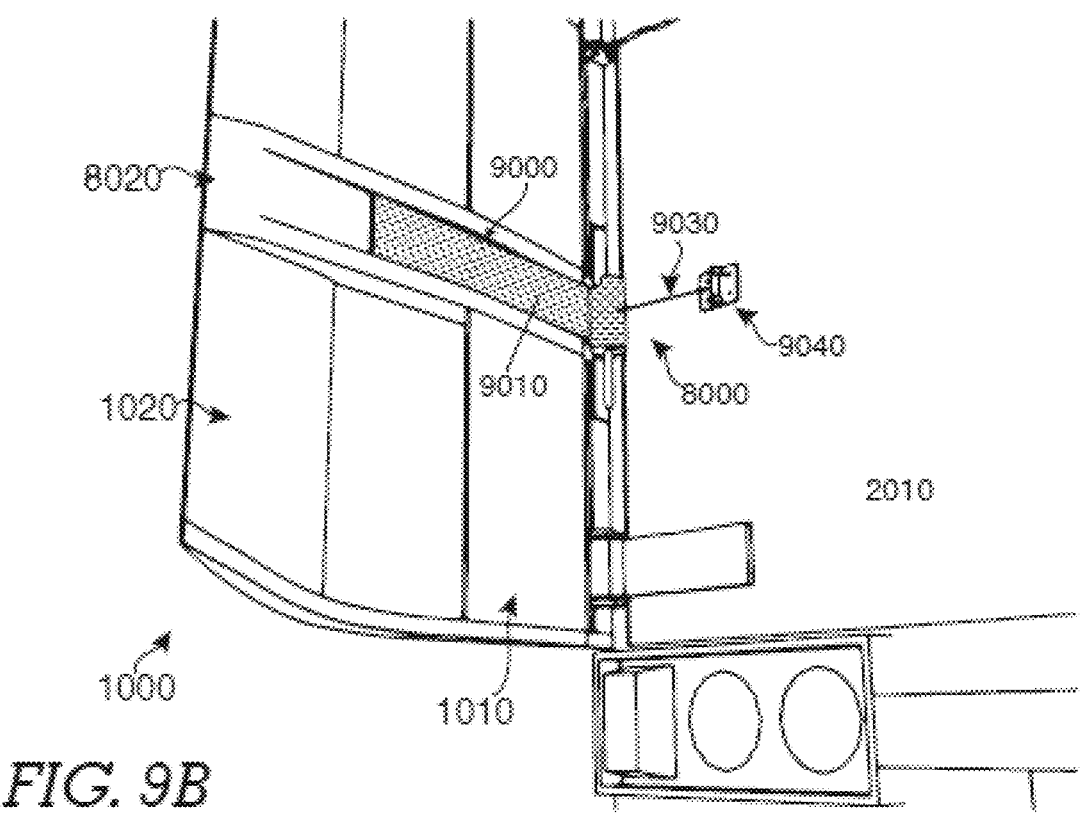
FIG. 9B is a perspective view of a rear portion of a vehicle having a planar form.

In certain embodiments of the present disclosure, as shown in FIG. 9A, comprise an aerodynamic device 1000 with a plurality of mounting stiffeners 8020. Referring to FIG. 9A, it may be so desired to configure a mounting stiffener 8020 with a channel recess 9000 longitudinally along the length on the inward side of the mounting stiffener 8020. Referring to FIG. 9B, the hinged mount 8000 comprises a brace structure 9010 configured to interface with and be affixed within a channel recess 9000 of the mounting stiffeners 8020. Referencing FIG. 8, the rotative positioning provided by the hinged mounts 8000 allow movement of the aerodynamic device 1000 to prevent the aerodynamic device 1000 from interfering with the swing of a door 2010 opening outward. As shown in FIG. 8, it may be desired in certain embodiments for the aerodynamic device 1000 to further comprise clearance notches 8010 configured to allow clearance around a hinged mount 8000, preventing interference between the aerodynamic device 1000 and the hinged mount 8000.

Certain embodiments of an apparatus, referring to FIG. 9B are configured for use with a vehicle 2000 with aft-plane mounted doors 2010 which swing outward. The apparatus comprising an aerodynamic device 1000 and hinged mounts 8000, further comprises a tensile component 9030. The tensile component 9030 provides tensile constraint to the aerodynamic device 1000, maintain a maximum predetermined angular offset from the aft-plane 2070. In such embodiments, a first end of the tensile component 9030 is affixed to an inward facing surface the aerodynamic device 1000 and a second end of the tensile component 9030 is affixed to an anchor component 9040. The anchor component 9040 is affixed to a planar surface such as a door 2010, as may be the case with a semi-trailer. In such embodiments, the aerodynamic device is permitted to rotate outwardly in conjunction with the outward swing of the door 2010 to prevent interference when the door 2010. It may be desired in such embodiments for the hinge mechanism to have an intermediate mechanical stop to prevent the inward rotation of the aerodynamic device beyond the predetermined angular separation from the aft-plane. It may also be desired for the tensile component 9030 to be configured for easy detachment.

Figure 9C:
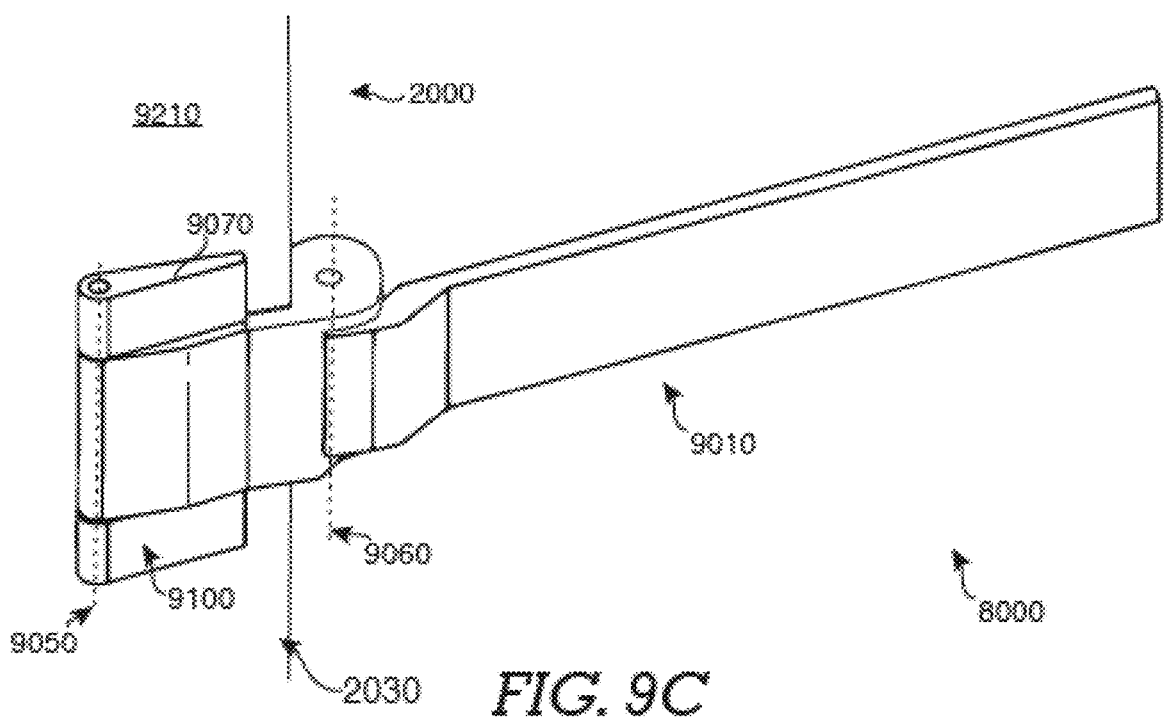
FIG. 9C is a perspective view of a hinge attached to a vehicle in certain embodiments.
Figure 9D:
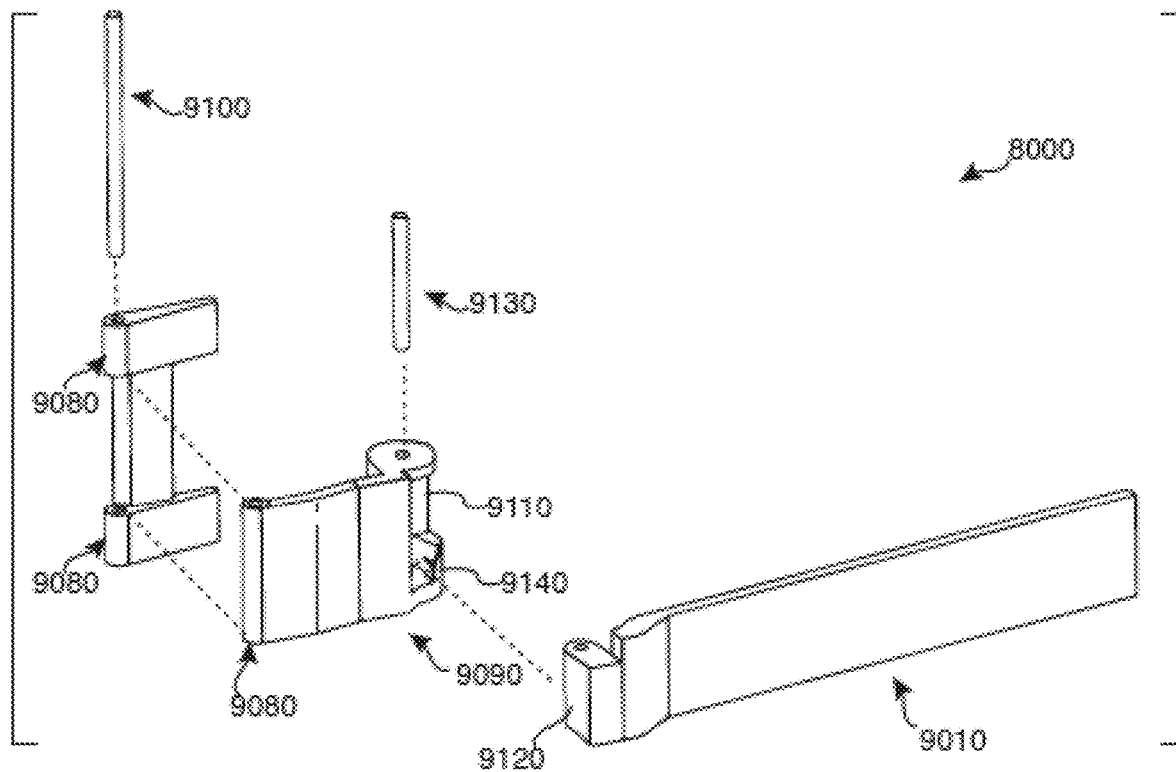
FIG. 9D is an exploded view of a hinge in certain embodiments.

Referring to FIGS. 9C and 9D, certain embodiments of a hinged mount 8000 comprising a brace structure 9010 further comprises a first hinge pivot axis 9050 and a second hinge pivot axis 9060. In such embodiments, a static mount plate 9070 having is attached to an exterior planar surface 4010 of a vehicle 2000, typically proximate to a vertical trailing edge 2030. The static mount plate 9070 has a plurality of hinge knuckles 9080. An intermediate hinge component 9090 having at least one hinge knuckle 9080 at first distal end mates with said static mount plates 9070 having first and second hinge knuckles 9080. The hinge knuckle 9080 of the intermediate hinge component 9090 is configured to interface between the hinge knuckles 9080 of the static mount plate 9070 aligning the hinge knuckles. This alignment of hinge knuckles 9080 allows a first pin component 9100 to be disposed through the aligned hinge knuckles 9080 to provide axial constraint between the static mount plate 9070 and the intermediate hinge component 9090 along the first hinge pivot axis 9060. The intermediate hinge component 9090 has a receiving feature 9110 at a second distal end configured to receive a mating feature at a first distal end of the brace structure 9010. In such embodiments the mating feature of the brace structure 9010 comprises a brace structure knuckle 9120. The brace structure knuckle 9120 and receiving feature 9110 each have a through-hole of equal diameter configured to align with the second hinge pivot axis 9060. The alignment of the through-holes along the second hinge pivot axis 9060 allows the insertion of a second pin component 9130 to provide axial constraint between the intermediate hinge component 9090 and the brace structure 9010.

Certain embodiments of the referring again to FIG. 9D, the receiving feature 9110 of the intermediate hinge component 9090 further comprises a mechanical stop 9140. The presence of the mechanical stop 9130 prevents axial rotation inward toward the vehicle 2000. However, the lifting of the brace structure 9010 allows the bypassing of the mechanical stop 9140. In embodiments where the brace structure 9010 is affixed to an aerodynamic device for the attachment to a vehicle, this allows a user to store the aerodynamic device against the aft-plane of the vehicle 2000.

Figure 10:
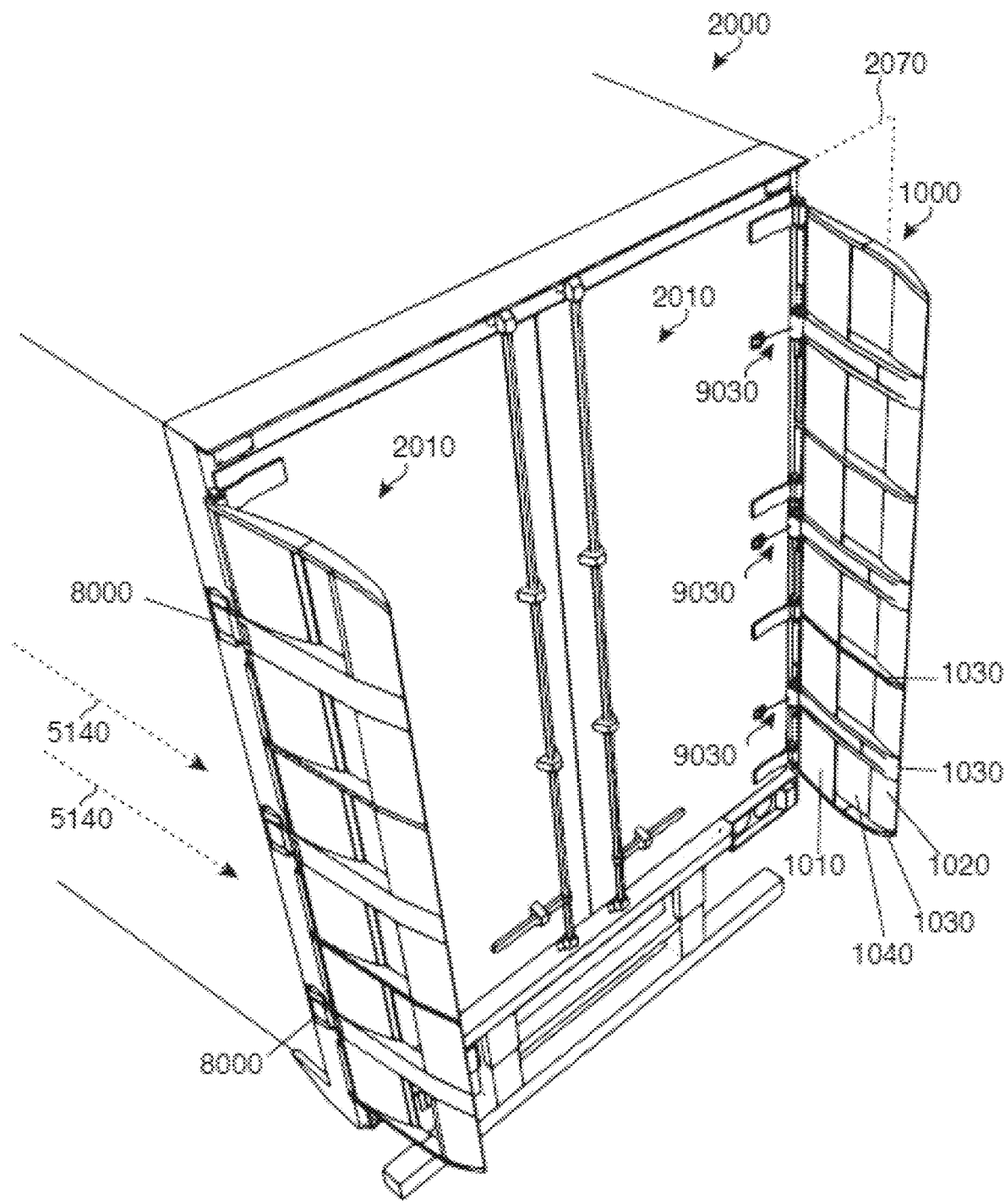
FIG. 10 is a perspective view of a planar form attached to a vehicle in certain embodiments.

In certain embodiments of the present disclosure, as shown in FIG. 10, comprise a system for the aerodynamic improvement of a vehicle such as a semi-trailer. Such embodiments comprise a plurality of aerodynamic devices 1000, each attached to the vehicle 2000 in proximity to the aft-plane of the vehicle. The aerodynamic devices 1000 are configured to interact with airflow 5140 surrounding the vehicle associated with the forward travel of the vehicle. The aerodynamic devices further comprise an airfoil 1010, a stabilizer 1020, a plurality of stiffeners 1030 and a plurality of apertures 1040. Certain embodiments of the present disclosure dispose the aerodynamic devices 1000 parallel with the general direction of airflow 5140 along the vehicle 2000 while alternate embodiments dispose the aerodynamic devices 1000 at a device offset angle 4020 from the direction of airflow 5140. In certain alternative embodiments, the aerodynamic devices 1000 are disposed at a device offset angle 4020 of 7-degrees inward toward the vehicle 2000. The plurality of aerodynamic devices 1000 affixed to the vehicle 2000 using a hinged mechanism 8000 allows the rotative repositioning of the aerodynamic devices 1000 in relation to the vehicle 2000 to prevent interference with such operations as the opening of a door 2010. The system further comprises a plurality of tensile components 9030 affixed between each aerodynamic device 1000 and to maintain an angular separation from the aft-plane 2070 of the vehicle 2000 when the doors 2010.

It will be appreciated to those skilled in the art that the fixation of the apparatus or system as disclosed herein need not be affixed in a hinged manner and one or more aerodynamic devices 1000 may be statically affixed to the vehicle.

Figure 11:
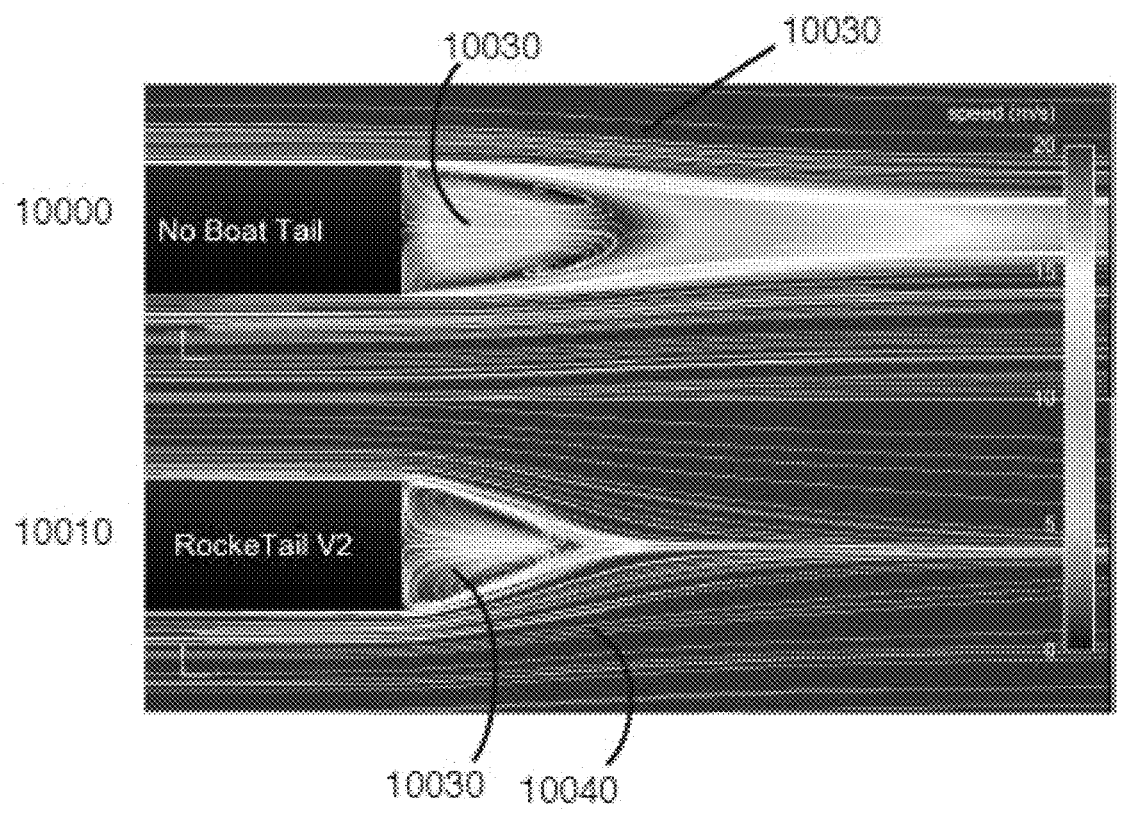
FIG. 11 shows simulation results comparing an embodiment of the present disclosure to a reference vehicle without aerodynamic improvements.

As shown in FIG. 11, comparative simulations were conducted in accordance with SAE J1252 testing protocol. The comparative test surrounded two vehicles: A baseline truck 10000 and a test truck 10010. The baseline truck 10000 is equipped with a standard tractor and 53 ft trailer with no aerodynamic improvements. The test truck 10010 is equipped with a standard semi-truck and 53-foot semi-trailer with a certain embodiment of the aerodynamic device as discussed herein. The tapering of flow dynamics as shown behind the test truck 10010 demonstrates more efficient conversion from turbulent flow 10030 to a laminar flow 10040 pattern trailing the semi-trailer than that of the reference truck 10000. The more efficient conversion to laminar flow 10040 translates into lower pressure differentials and mitigated turbulent flow characteristics, which are factors associated with improving aerodynamic efficiency.

Figure 12A:
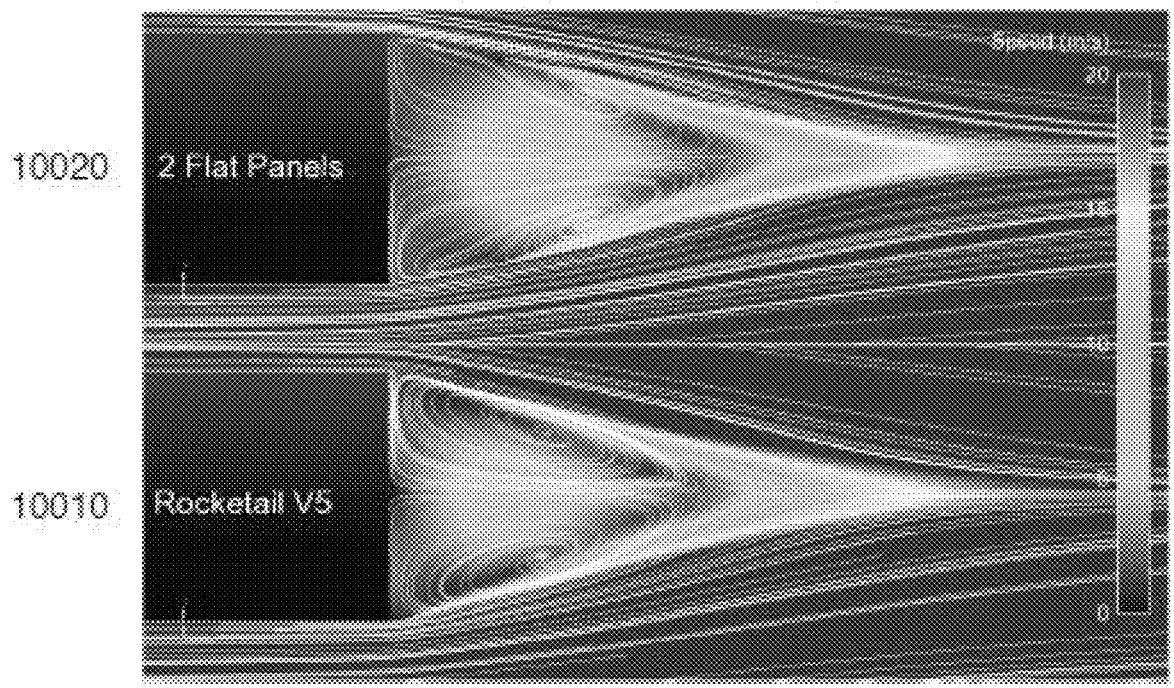
FIG. 12A shows simulation results comparing an embodiment of the present disclosure to a reference vehicle with over-sized flat panels.
Figure 12B:
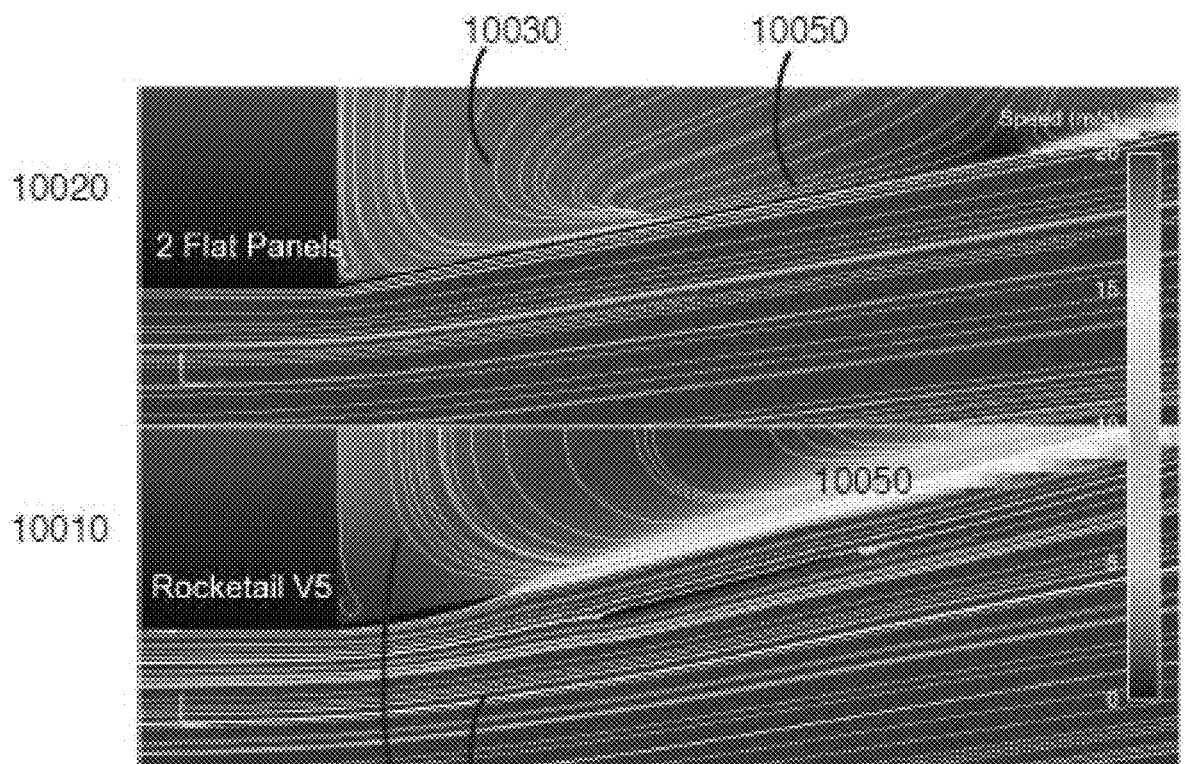
FIG. 12B is a close-up view of simulation results shown in FIG. 12A.

As shown in FIG. 12A, comparative simulations were conducted in accordance with SAE J1252 testing protocol. The comparative test surrounded two vehicles: A reference truck 10020 and a test truck 10010. The reference truck 10020 is equipped with a standard tractor and 53-foot trailer with aerodynamic improvements comprising two flat panels mounted at the vertical trailing edges of the reference truck 10020 extending rearward 4 feet and having an optimal angle of attack of 11-degrees inward toward the semi-trailer (Salari, Kambiz DOE's Effort to Improve Heavy Vehicle Aerodynamics through Joint Experiments and Computations. Lawrence Livermore Laboratory, 2013. LLNL-PRES-629672). The test truck 10010 is equipped with a standard semi-truck and 53 foot semi-trailer with a certain embodiment of the aerodynamic device as discussed herein extending away from the semi-trailer rearward 27 inches and having an angle of attack of 7-degrees inward toward the semi-trailer. As shown, the efficiency of conversion to laminar flow 10040 between the reference truck 10020 and the test truck 10010 are similar despite the aerodynamic device extending rearward less than half the distance than that of the flat panels of the reference truck 10020. As shown in FIG. 12B, upon closer inspection of boundary region 10050 between the laminar flow 10040 and the turbulent flow 10030, it is apparent that the flow dynamics show less turbulent flow 10030 in the case of the test truck 10010 due to pressure equalization provided by airflow redirection.

Figure 13A:
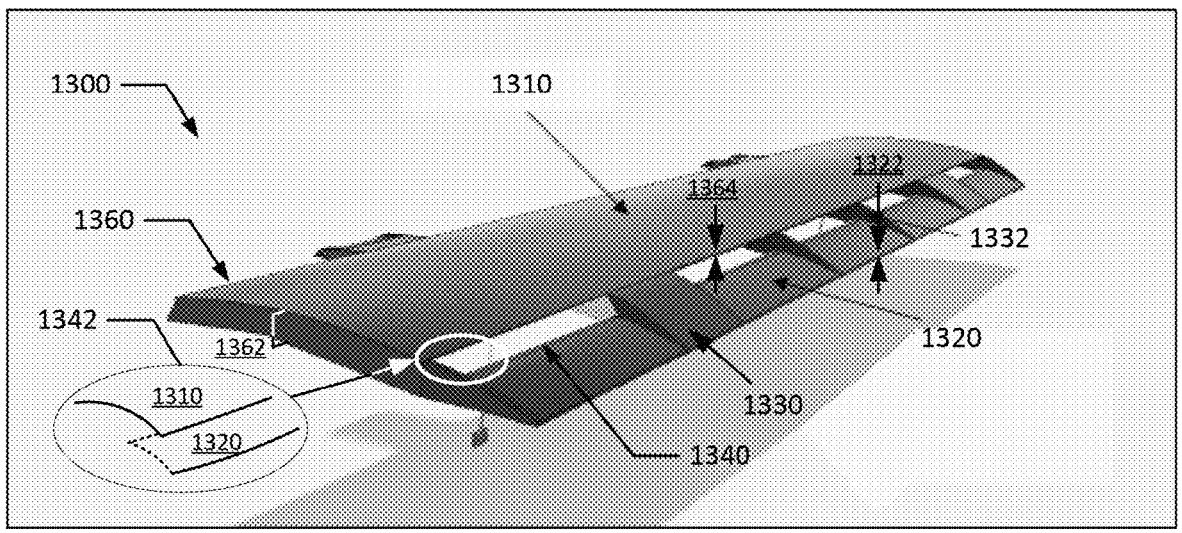
FIG. 13A is a front perspective view of an aerodynamic device.

FIG. 13A is a front perspective view of an aerodynamic device 1300 in accordance with another embodiment of the present disclosure. In the illustrated embodiment of FIG. 13A, the aerodynamic device 1300 includes a primary airfoil 1310 and a secondary airfoil 1320 (which acts as a stabilizer) interconnected by a series of stiffeners 1330 and struts 1332 spanning between them. In one embodiment, the secondary airfoil 1320 is configured to reduce the airflow separation from the primary airfoil 1310.

Figure 13B:
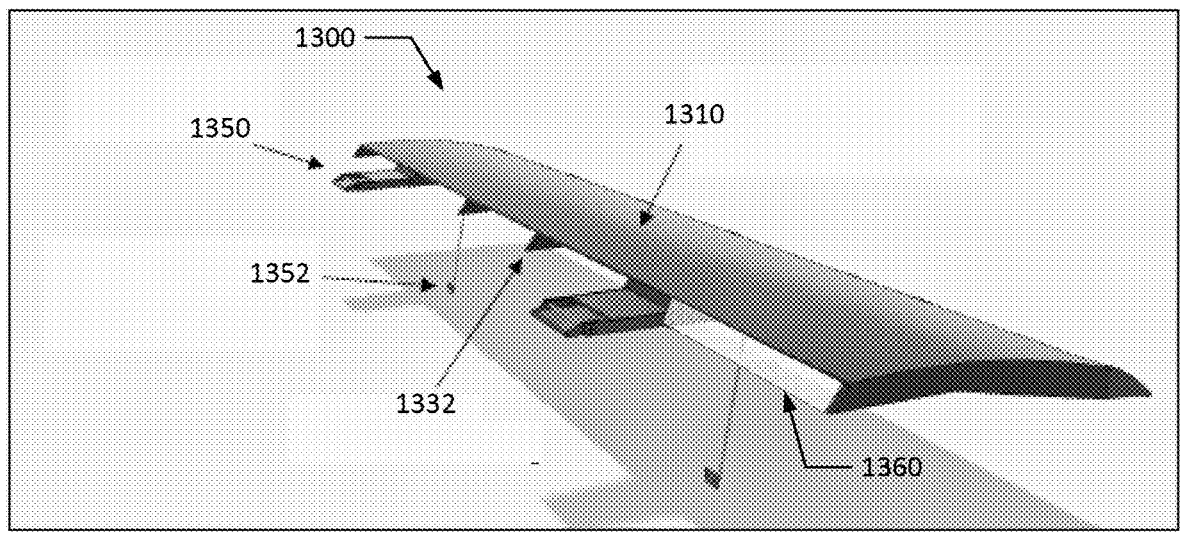
FIG. 13B is a rear perspective view of the aerodynamic device.

FIG. 13B is a rear perspective view of the aerodynamic device 1300 in accordance with another embodiment of the present disclosure. The rear perspective view of the aerodynamic device 1300 shown in the illustrated embodiment of FIG. 13B further includes: a hinge 1350 configured to mount to the side of the trailer; and a locking rod 1352 configured to attach to the trailer door for auto deploying and/or retracting of the aerodynamic device 1300. The view of FIG. 13B also shows the rear view of the struts 1332.

In the illustrated embodiments of FIGS. 13A and 13B, certain embodiments may use a primary airfoil 1310 having a thin-form in concert with a stabilizer 1320 to modify airflow direction. For example, the primary airfoil 1310, such as in the form of a sheet with a curved profile, provides an outboard surface and an inboard surface with substantially similar arc lengths as opposed to the form of a wing-form airfoil having an outboard (upper) surface and inboard (lower) surface with differing arc lengths. The use of an airfoil having a thin-form as described provides, in certain embodiments, a lighter apparatus for the improvement of aerodynamics of a vehicle. A thin-form air-foil in certain embodiments also provides the benefit of a smaller cross-sectional area presented to the general airflow providing lower aerodynamic drag forces known as form-drag.

Form drag is understood by those skilled in the art to depend upon a cross-sectional profile of a form wherein the cross-section is orthogonal to the general airflow. Such an airfoil may be desired to provide a concave and a convex side of an airfoil, configured to interact with the general airflow.

In the illustrated embodiments of FIGS. 13A and 13B, certain embodiments provide airflow inlets 1360 and airflow outlets 1340 for the ducting of the general airflow over inboard and outboard surfaces of an airfoil, a stabilizer, and other features that may be used with such an apparatus in the improvement of aerodynamics of a vehicle. Such ducting allows for preparation of the general airflow surrounding a vehicle prior to the interaction with certain elements such as an airfoil or stabilizer. Furthermore, such ducting allows for directing a desired portion of the general airflow to interact with inboard and outboard surfaces associated with an airfoil or stabilizer.

In the illustrated embodiments of FIGS. 13A and 13B, the preparation of the general airflow prior to interactions with an airfoil or stabilizer provides a cleaner general airflow. It will be appreciated that inefficient flow dynamics turbulence caused by eddies and vortices may exist along external surfaces of a vehicle. Such turbulence may be caused by surroundings such as separation between portions of a vehicle (such as between a semi-truck and a trailer), or cross-winds. The preparation of the airflow, such as through ducting, decreases inefficient flow dynamics from the general airflow. The interaction of turbulence negatively impacts the operation of an apparatus for the improvement of aerodynamics. In certain scenarios, turbulence may cause oscillation of, and potentially damage such an apparatus. The decrease of inefficient flow-dynamics through ducting allows higher efficiency operation of an apparatus as described.

Referring to FIG. 13A, inset 1342 shows the detailed design of the primary airfoil 1310 and the second airfoil 1320 (i.e., the stabilizer). According to FIG. 13A, certain embodiments of an apparatus for the improvement of aerodynamics of a vehicle comprise an airfoil 1310 offset from an exterior surface of a vehicle and a stabilizer 1320 wherein the airfoil 1310 overlaps the stabilizer 1320. Such an overlap provides a configuration wherein the apparatus has an airflow inlet 1360 and an airflow outlet 1340. A portion of the general airflow from the exterior surface of the vehicle is directed into the airflow inlet 1360 of the apparatus and along the inboard surface of the airfoil 1310. A portion of the general airflow flowing along the inboard surface of the airfoil 1310 is directed through the airflow outlet 1340 for subsequent interaction with the stabilizer 1320. Furthermore, a portion of the general airflow flowing along the outboard surface of the airfoil 1310 is directed through the airflow outlet 1340 for subsequent interaction with the stabilizer 1320.

Figure 13C:
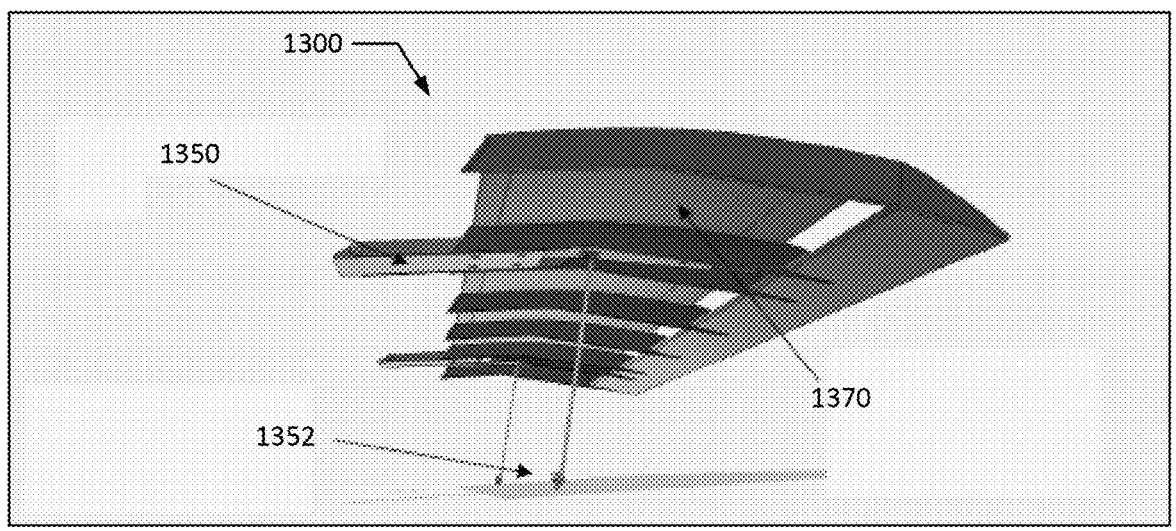
FIG. 13C is a bottom perspective view of the aerodynamic device.

FIG. 13C is a bottom perspective view of the aerodynamic device 1300 in accordance with another embodiment of the present disclosure. The bottom perspective view of the aerodynamic device 1300 shown in the illustrated embodiment of FIG. 13C further includes an air channel 1370 which allows the air to flow under the primary airfoil 1310 and over the second airfoil 1320. The view of FIG. 13C also shows the bottom view of the hinge 1350 and the locking rod 1352.

In summary, the illustrated embodiments of FIG. 13A to FIG. 13C show an apparatus for improving aerodynamics of a vehicle. The apparatus includes a plurality of stiffeners 1330, 1332, the first airfoil 1310, a second airfoil 1320, an airflow inlet 1360, and an airflow outlet 1340. The plurality of stiffeners 1330, 1332 are offset from each other. The first airfoil 1310 is configured as a thin-form sheet. The second airfoil 1320 is coupled to the first airfoil 1310 using the plurality of stiffeners 1330, 1332, wherein a trailing edge of the first airfoil 1310 overlaps a leading edge of the second airfoil 1320 (see inset 1342 of FIG. 13A). The airflow inlet 1360 is defined by a leading edge of the first airfoil 1310 and a pair of stiffeners of the plurality of stiffeners 1330, 1332. The airflow outlet 1340 is defined by by the trailing edge of the first airfoil 1310, the leading edge of the second airfoil 1320, and the pair of stiffeners. The thin-form sheet of the first airfoil 1310 is configured in a curved shape with pre-defined radius of curvature 1362 and thickness 1364. Since the thickness 1364 is very small, it can be stated that the curve shape has substantially similar arc lengths for an outboard surface and an inboard surface of the first airfoil 1310. The apparatus further includes a hinge unit 1350 coupled to the inboard surface of the first airfoil 1310 and configured to mount to an external surface of the vehicle. The apparatus further includes a locking rod 1352 configured to attach to a door of the vehicle for auto deploying and retracting of the apparatus.

Figure 14:
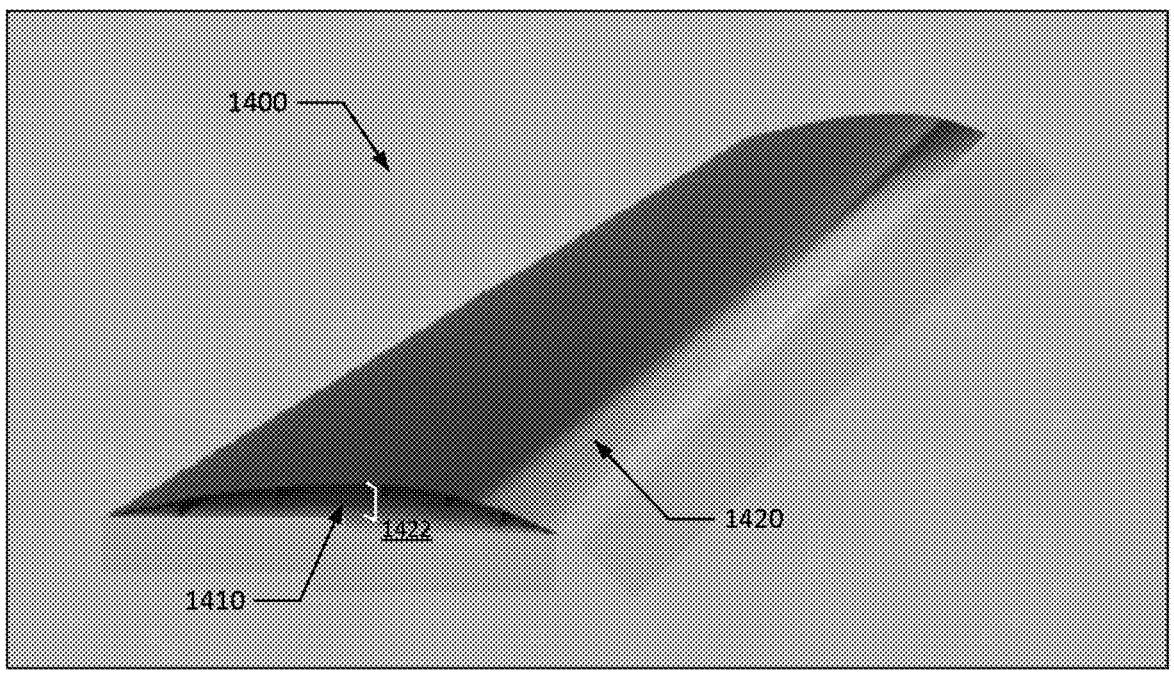
FIG. 14 is a front perspective view of a convex aerodynamic device.

FIG. 14 is a front perspective view of a convex aerodynamic device 1400 in accordance with one embodiment of the present disclosure. In the illustrated embodiment of FIG. 14, the improved aerodynamic device 1400 is configured into a convex form 1410 which may be affixed to a top surface of the vehicle. Typically, such a convex form is mounted substantially perpendicular to the general airflow surrounding a vehicle wherein the convex aerodynamic device 1400 extends beyond the boundary region and into the general airflow region 1420. Such embodiments of a convex form 1410 serve to improve flow separation from airflow traveling in contact or close proximity to the top surface of a vehicle. The improvement of flow separation from the top of the vehicle serves to decrease drag caused by eddy formation, vortices or other inefficient flow dynamics.

Given the above description of the airflow and the designs of the airfoils and devices shown in FIGS. 13A through 14, the radius of curvatures and thicknesses of the airfoils and devices can vary as shown. For example, in one implementation shown in FIG. 13A, the radius of curvature 1362 of the primary foil 1360 is designed to be approximately 1 inch. Also, as shown in FIG. 13A, the thickness 1364 of the primary airfoil 1360 is designed to be approximately 0.20 to 0.25 inches thick, while the thickness 1322 of the secondary airfoil 1320 is designed to be approximately between ⅛ to ⅜ of an inch. Further, as shown in FIG. 14, the radius of curvature 1422 of the aerodynamic device 1400 is designed to be approximately between 1 and 1.75 inches.

Figure 15:
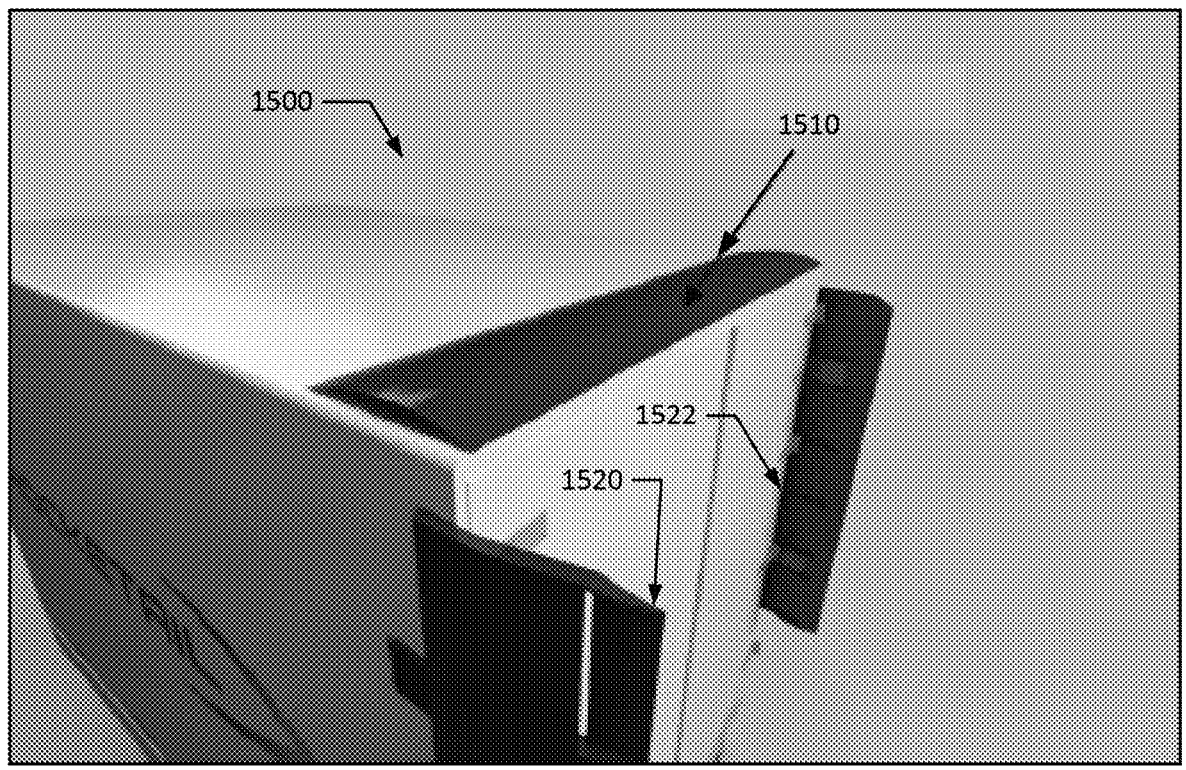
FIG. 15 is a rear perspective view of a vehicle including a top element coupled to the top of the vehicle and aerodynamic devices coupled to the sides of the vehicle.

FIG. 15 is a rear perspective view of a vehicle 1500, such as a trailer, including a top element 1510 and aerodynamic devices 1520, 1522 coupled to the sides of the vehicle in accordance with one embodiment of the present disclosure. In the illustrated embodiment of FIG. 15, the top element 1510 is configured similarly to the convex aerodynamic device 1400 shown in FIG. 14 and each of the aerodynamic devices 1520, 1522 is configured similarly to the aerodynamic device 1300 shown in FIGS. 13A to 13C.

In summary, the illustrated embodiments of FIG. 13A to FIG. 15 show a system for improving aerodynamics of a vehicle. The system 1500 includes first 1520, second 1522, and third 1510 aerodynamic units. Each unit of the first and second aerodynamic units 1520, 1522 includes a first airfoil 1310 configured as a thin-form sheet and a second airfoil 1320 interconnected to the first airfoil 1310 using a plurality of stiffeners 1330, 1332. A trailing edge of the first airfoil 1310 overlaps a leading edge of the second airfoil 1320 as shown in inset 1342. As shown in FIG. 15, the first and second aerodynamic units 1520, 1522 are configured to mount to side surfaces of the vehicle. The third aerodynamic unit 1510 is shaped in a convex form and configured to mount to a top surface of the vehicle.

The above descriptions of the disclosed embodiments are provided to enable any person skilled in the art to make or use the disclosure. Various modifications to these embodiments will be readily apparent to those skilled in the art, and the generic principles described herein can be applied to other embodiments without departing from the spirit or scope of the disclosure. For example, although the above-described examples only include three aerodynamic units coupled to the aft section of the vehicle, the apparatus and system as described in the description section of the present disclosure can use more or less than three units. Thus, it will be understood that the description and drawings presented herein represent embodiments of the disclosure and are therefore representative of the subject matter which is broadly contemplated by the present disclosure. It will be further understood that the scope of the present disclosure fully encompasses other embodiments that may become obvious to those skilled in the art and that the scope of the present disclosure is accordingly limited by nothing other than the appended claims.

Accordingly, the foregoing embodiments are merely presented as examples and are not to be construed as limiting the present disclosure. The present teachings can be readily applied to other types of apparatus and/or devices. The description of the present disclosure is intended to be illustrative, and not to limit the scope of the claims. Many alternatives, modifications, and variations will be apparent to those skilled in the art.

The invention claimed is:

1. An apparatus for improving aerodynamics of a vehicle, the apparatus comprising:
   a plurality of stiffeners offset from each other;
   a first airfoil configured with a thin-form sheet having a curved shape with a substantially similar arc length for an outboard surface or an inboard surface of the first airfoil;
   a second airfoil coupled to the first airfoil using the plurality of stiffeners, wherein a trailing edge of the first airfoil overlaps a leading edge of the second airfoil;
   an airflow inlet defined by a leading edge of the first airfoil and a pair of adjacent stiffeners of the plurality of stiffeners; and
   an airflow outlet defined by the trailing edge of the first airfoil, the leading edge of the second airfoil, and he pair of stiffeners.

2. The apparatus of claim 1, further comprising a hinge unit coupled to the inboard surface of the first airfoil and configured to mount to an external surface of the vehicle.

3. The apparatus of claim 1, wherein the second airfoil is configured to be partially overlapped by the first airfoil to reduce airflow separation from the first airfoil.

4. The apparatus of claim 1, further comprising a locking rod configured to attach to a door of the vehicle for auto deploying and retracting of the apparatus.

5. The apparatus of claim 1, wherein the second airfoil is configured as a stabilizer.

6. A system for improving aerodynamics of a vehicle, the system comprising:
   first and second aerodynamic units, each aerodynamic unit including a first airfoil configured with a thin-form sheet and a second airfoil interconnected to the first airfoil using a plurality of stiffeners, wherein a trailing edge of the first airfoil overlaps a leading edge of the second airfoil, wherein the first and second aerodynamic units are configured to mount to side surfaces of the vehicle; and
   a third aerodynamic unit configured to mount to a top surface of the vehicle, wherein the third aerodynamic unit extends beyond a boundary region and into a region of the general airflow.

7. The system of claim 6, wherein each aerodynamic unit further includes:
   an airflow inlet defined by a leading edge of the first airfoil and a pair of adjacent stiffeners of the plurality of stiffeners; and
   an airflow outlet defined by the trailing edge of the first airfoil, the leading edge of the second airfoil, and the pair of adjacent stiffeners.

8. The system of claim 6, wherein the third aerodynamic unit is mounted substantially perpendicular to general airflow surrounding the vehicle.

9. The system of claim 6, wherein a radius of curvature of the third aerodynamic unit is configured to be approximately between 1 and 1.75 inches.

* * * * *